United States Patent
Leibeling et al.

(10) Patent No.: US 12,403,775 B2
(45) Date of Patent: Sep. 2, 2025

(54) METHOD AND MOTOR CONTROLLER FOR OPERATING A DRIVE MOTOR OF A VEHICLE

(71) Applicant: Robert Bosch GmbH, Stuttgart (DE)

(72) Inventors: Frank Leibeling, Moeglingen (DE); Julien Kuehl, Freiberg Am Neckar (DE); Michael Erden, Bietigheim-Bissingen (DE); Stefan Koschlig, Loechgau (DE); Tina Geiger, Grossbottwar (DE); Lea Riegger, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 144 days.

(21) Appl. No.: 18/257,755

(22) PCT Filed: Nov. 25, 2021

(86) PCT No.: PCT/EP2021/082915
§ 371 (c)(1),
(2) Date: Jun. 15, 2023

(87) PCT Pub. No.: WO2022/174949
PCT Pub. Date: Aug. 25, 2022

(65) Prior Publication Data
US 2024/0140206 A1    May 2, 2024

(30) Foreign Application Priority Data
Feb. 17, 2021   (DE) .................... 10 2021 201 534.4

(51) Int. Cl.
*B60L 15/20*       (2006.01)
*B60L 3/10*        (2006.01)

(52) U.S. Cl.
CPC ......... *B60L 15/20* (2013.01); *B60L 2240/421* (2013.01)

(58) Field of Classification Search
CPC .. B60L 15/20; B60L 3/10; B60L 3/102; B60L 3/106
See application file for complete search history.

(56) References Cited

U.S. PATENT DOCUMENTS

| | | | |
|---|---|---|---|
| 6,199,650 B1 | 3/2001 | Masberg et al. | |
| 2009/0042688 A1* | 2/2009 | Itou | H02P 6/08 477/3 |

(Continued)

FOREIGN PATENT DOCUMENTS

| | | | | |
|---|---|---|---|---|
| DE | 4435775 | * | 4/1966 | ........... B60L 3/10 |
| DE | 4225683 A1 | | 2/1994 | |

(Continued)

OTHER PUBLICATIONS

International Search Report for PCT/EP2021/082915, Issued Mar. 21, 2022.

*Primary Examiner* — Tan Q Nguyen
(74) *Attorney, Agent, or Firm* — NORTON ROSE FULBRIGHT US LLP

(57) ABSTRACT

A method for operating a drive motor which is coupled to at least one wheel of a vehicle via a drive train. The drive motor is controlled using a dynamic model of the drive train. The model maps a relationship between a drive torque transmitted via the drive train and a deformation of the drive train.

8 Claims, 1 Drawing Sheet

(56) References Cited

U.S. PATENT DOCUMENTS

2012/0323424 A1\* 12/2012 Merkel .................. B60L 15/20
                                                        903/903
2018/0086208 A1   3/2018 Hodgson et al.
2018/0149264 A1\* 5/2018 Pilzweger ........... F16H 61/0213
2022/0024457 A1\* 1/2022 Kropf ................. B60W 50/085

FOREIGN PATENT DOCUMENTS

DE       4435775 A1    4/1996
DE   102015104425 A1   10/2015
JP      2017085851 A    5/2017

\* cited by examiner

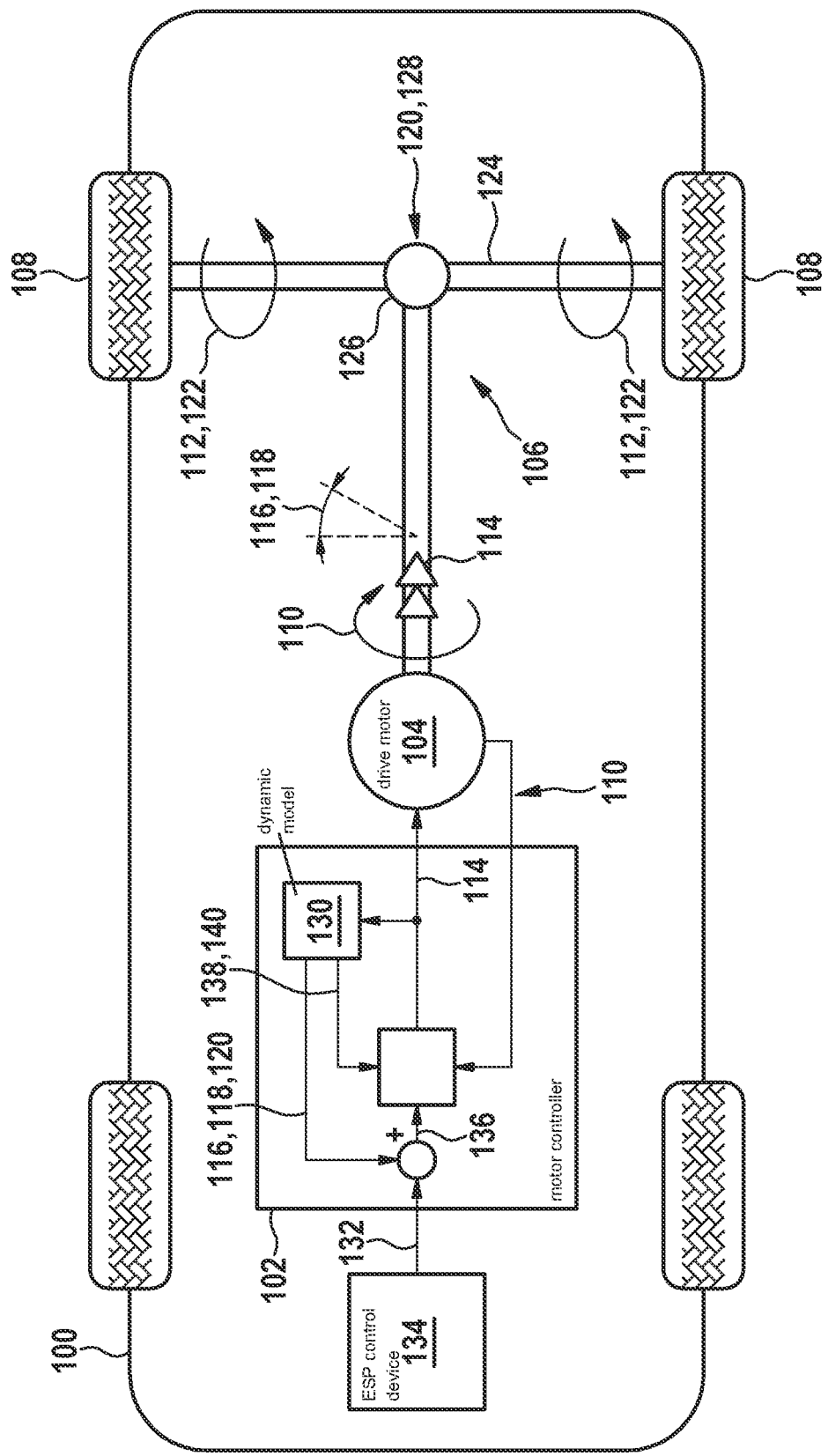

METHOD AND MOTOR CONTROLLER FOR OPERATING A DRIVE MOTOR OF A VEHICLE

FIELD

The present invention relates to a method for operating a drive motor coupled to at least one wheel of a vehicle via a drive train, and to a corresponding motor controller.

BACKGROUND INFORMATION

A vehicle can have a traction control system. If at least one wheel of the vehicle has too much drive slip, the traction control system can reduce or limit a drive torque at the wheel. The slippage can be captured by a speed sensor coupled to the wheel and detected in a speed signal of the speed sensor. In response to the detection, a drive motor of the vehicle that is coupled to the wheel can be actuated to reduce its torque. Alternatively or additionally, a brake of the wheel can be actuated to brake the wheel by means of a braking torque acting against the drive torque. In order to improve the control by means of a shorter reaction time, the controller based on the drive movement of the drive motor can be located in the motor controller. This can be referred to as a distributed traction control.

SUMMARY

The present invention provides a method for operating a drive motor coupled to at least one wheel of a vehicle via a drive train and a corresponding motor controller, and a corresponding computer program product and a machine-readable storage medium.

Advantageous embodiments, developments, and improvements of the present invention here emerge from the disclosure herein.

Embodiments of the present invention can advantageously make it possible to compensate an effect of a drive train, arranged between a drive motor and a wheel, on a rotational movement of the wheel by means of a changed actuation of the drive motor. In particular, a traction control system with short signal transit times can thus be implemented. A drive movement of the drive motor can be detected. The effects of the drive train on the rotational movement of the wheel can be read out from a previously stored model. A drive torque of the drive motor can be controlled directly, compensated by the effect of the drive train, in order to influence the drive movement.

According to an example embodiment of the present invention, a method for operating a drive motor coupled to at least one wheel of a vehicle via a drive train is provided, wherein the drive motor is actuated using a dynamic model of the drive train stored in a motor controller of the drive motor, wherein the model maps a relationship between a drive torque transmitted via the drive train and a deformation of the drive train.

Ideas for embodiments of the present invention may be considered, inter alia, as being based on the concepts and findings described below.

A drive motor can be an internal combustion engine or an electric motor. The drive motor can in particular be an electric motor in which a rotor position of the drive motor can substantially be known at any time. The rotor position can be used to control a drive torque of the drive motor. The rotor position can be detected, for example, using a rotor position encoder. During the control, the drive torque of the drive motor can be controlled such that the drive motor rotates at a desired drive speed.

A drive train of a vehicle may comprise one or more shafts and gear units. The drive train is designed to transmit a rotational movement of the drive motor to at least one wheel of the vehicle. The drive train can also comprise at least one differential gear unit for transmitting the rotational movement to at least two wheels of the vehicle. Elements of the drive train are flexible to a small extent and can deform slightly due to the drive torque transmitted via the drive train. For example, there may also be a slight play between the elements in order to make a relative movement of the elements possible.

According to an example embodiment of the present invention, a model of the drive train can map the deformation or the play of the drive train as a function of the drive torque. The model can be based on data points captured under controlled conditions and map the deformation over an operating range of the drive motor. Interpolation can be performed between the data points. Alternatively or additionally, the deformation can also be stored as a formula in the model. The model can be determined on the basis of experiments and/or simulations. Furthermore, the model can be determined using analytical and/or numerical calculations. The model can map the deformation for an increasing drive torque as well as for a decreasing drive torque.

As the deformation, the model can map a torsion of the drive train as a function of the drive torque. The deformation or the torsion can change linearly or non-linearly depending on the drive torque. The drive motor can be actuated with the torsion being taken into account. A torsion can represent a difference between an input angular position of the drive train at the drive motor and an output angular position of the drive train at the wheel. The torsion can be referred to as twisting. Due to the torsion, the drive motor can run slightly ahead of the wheel in the case of an accelerating drive torque. In the case of a braking drive torque, the drive motor can lag slightly behind the wheel. The braking drive torque can be referred to as drag torque. The accelerating drive torque and the braking drive torque can have opposite signs.

A drive speed of the drive motor can be controlled using a speed specification and the torsion. A speed specification can be provided by a control device of an ESP (electronic stability program) of the vehicle. Due to the torsion, the drive speed during acceleration can be increased to slightly higher than the speed specification. During braking, the drive speed can be lowered to slightly below the speed specification.

As the deformation, according to an example embodiment of the present invention, the model can map a transmission backlash in the drive train as a function of the drive torque. At a zero crossing of the drive torque, the drive motor can be actuated taking the transmission backlash into account. A transmission backlash can result from fits and manufacturing tolerances. The transmission backlash can be an angular portion of the rotational movement in which substantially no drive torque can be transmitted. Absence of transmission backlash can damage a transmission. A zero crossing can be a sign change of the drive torque. At a zero crossing, the drive torque can change from the accelerating drive torque to the braking drive torque, and vice versa. Due to the transmission backlash, the drive motor can operate against no resistance or only a low resistance for the angular portion.

The drive speed can be controlled at the zero crossing using the speed specification and the transmission backlash. At the zero crossing, the drive speed can be controlled to the rotational speed specification, offset by the transmission backlash. The transmission backlash can be factored into the calculation for the drive speed.

The model can, in addition, map at least one control condition for the drive motor as a function of the drive torque. In the event of a change in the drive torque, the drive motor can be actuated using a control condition read out from the model. A control condition may, for example, be a maximum rate of increase of the drive torque. If the speed specification requires a large increase in the drive torque, the rate of increase of the drive torque can be limited to the control condition in order to protect the drive train and/or the drive motor.

According to an example embodiment of the present invention, in order to prevent incorrect control, a waiting time dependent on the change in the drive torque can be read out from the model as a control condition. The drive motor can be actuated with a delay by the waiting time. The waiting time can be observed, for example, at a zero crossing of the drive torque. After the waiting time, the drive train can have passed through the torsion and/or the transmission backlash. After the waiting time, the drive torque can be transmitted directly to the at least one wheel.

This method can be implemented, for example, in software or hardware or in a mixed form of software and hardware, for example in a motor controller.

The present invention furthermore provides a motor controller which is designed to carry out, control or implement the steps of a variant of the method presented here in corresponding devices.

The motor controller can be an electrical device with at least one computing unit for processing signals or data, at least one storage unit for storing signals or data, and at least one interface and/or one communication interface for reading or outputting data embedded in a communication protocol. The computing unit can, for example, be a signal processor, a so-called system ASIC, or a microcontroller for processing sensor signals and outputting data signals on the basis of the sensor signals. The memory unit can, for example, be a flash memory, an EPROM, or a magnetic memory unit. The dynamic model of the drive train can be stored in the storage unit. The interface can be designed as a sensor interface for reading the sensor signals from a sensor and/or as an actuator interface for outputting the data signals and/or control signals to an actuator. The communication interface can be designed to read or output the data in a wireless and/or wired manner. The interfaces may also be software modules that are present, for example, on a microcontroller in addition to other software modules.

A computer program product or a computer program with program code that can be stored on a machine-readable carrier or storage medium, such as a semiconductor memory, a hard disk memory, or an optical memory, and that is used for carrying out, implementing, and/or actuating the steps of the method according to one of the embodiments described above is advantageous as well, in particular when the program product or program is executed on a computer or an apparatus.

It is pointed out that some of the possible features and advantages of the present invention are described herein with reference to different embodiments. A person skilled in the art will recognize that the features of the motor controller and of the method can be suitably combined, adapted, or replaced in order to arrive at further embodiments of the present invention.

BRIEF DESCRIPTION OF THE DRAWINGS

Embodiments of the present invention are described below with reference to the FIGURES, and neither the FIGURES nor the description should be construed as limiting the present invention.

FIG. 1 shows a representation of a vehicle with a motor controller according to an embodiment example of the present invention.

The FIGURE is merely schematic and not true to scale. Identical reference signs refer to identical or identically acting features.

DETAILED DESCRIPTION OF EXAMPLE EMBODIMENTS

FIG. 1 shows a representation of a vehicle 100 with a motor controller 102 according to an embodiment example. The vehicle 100 has a drive motor 104. The drive motor 104 is coupled to at least one wheel 108 of the vehicle 100 via a drive train 106. The drive train 106 can have a fixed transmission ratio of a drive speed 110 of the drive motor 104 to an output speed 112 of the drive train 106. The drive train 106 can also have a variable transmission ratio. The drive train 106 is at least partially elastically deformed by a drive torque 114 of the drive motor 104. As a result of a deformation 116 of the drive train 106, the drive speed 110 runs slightly ahead of the output speed 112. The deformation 116 can be, for example, a torsion 118 of the drive train 106. Likewise, the deformation 116 can be a transmission backlash 120 of the drive train 106.

When the drive motor 104 is directly coupled to a single wheel 108 via the drive train 106, the output speed 112 corresponds to a wheel speed 122 of the wheel 108 in a steady manner. If the drive train 106 comprises an axle 124 of the vehicle 100 with a differential 126, the output speed 112 corresponds to an axle speed 128 of the axle 124 in a steady manner. The axle speed 128 corresponds in a steady manner to an average value of the wheel speeds 122 of the wheels 108 of the axle 124.

The motor controller 102 controls the drive motor 104 using a dynamic model 130 of the drive train 106. The model 130 maps a relationship between the drive torque 114 of the drive motor 104 and the deformation 116 of the drive train 106.

The motor controller 102 reads in a speed specification 132 from an ESP control device 134 of the vehicle 100. The drive torque 114 is controlled in the motor controller 102 in such a way that the drive speed 110 follows the speed specification 132. However, an increasing drive torque 114 also increases the torsion 118. In order to achieve an output speed 112 corresponding to the speed specification 132, in one embodiment example a setpoint value 136 of the drive speed 110 is increased by the torsion 118. The transmission ratio of the drive train 106 is taken into account in this case.

If the drive torque 114 has a zero crossing, for example changes from a positive drive torque 114 to a negative drive torque 114, the torsion 118 becomes small. However, the transmission backlash 120 is passed through at the zero crossing. In one embodiment example, the setpoint value 136 of the drive speed 110 is corrected at the zero crossing by the transmission backlash 120.

In one embodiment example, the model 130 contains control conditions 138 for the drive motor 104 as a function of the drive torque 114. A control condition 138 is, for example, a waiting time 140 in the case of a zero crossing of the drive torque 114. After the zero crossing, the drive speed 110 is increased with a time delay due to the waiting time 140. The waiting time 140 gives the drive train 106 time to adapt to the changed conditions. At the end of the waiting time 140, the drive motor 104 can be controlled robustly and the drive speed 110 can be directly adjusted to the speed specification 132.

In other words, robust control is provided in the case of distributed traction control.

In the case of a traction control system with distributed controllers, a fast controller located in the motor controller of an electric drive or internal combustion engine is used in order to allow control without a transit-time delay due to communication times between different control devices. In this case, a setpoint specification for the controller, which is optimized in a situation-specific manner, emerges from the ESP.

In conventional traction controllers, wheel speeds are used in determining the drive slip. In the case of distributed traction control, however, instead of the wheel speeds, the actual speed of the motor is used and is compared with a setpoint motor speed in the motor controller. If the setpoint speed is exceeded, the drive torque is reduced by the controller, which enables faster control with higher control quality due to the eliminated communication times between different control devices.

The motor is usually connected to the wheels via a differential and shafts. Alternatively, it is also possible that per wheel one motor is via a shaft to the wheel. In this case, the connecting elements have unwanted properties, such as transmission backlash or torsion, so that the motor speed cannot be converted easily into wheel speeds using a proportionality factor. Even if the drive wheels do not have an excessive drive slip, the motor speed can increase due to the properties of the connecting elements to such an extent that a disruptive or overly-sensitive drive torque reduction takes place.

The approach presented here prevents sensitive drive torque reduction with the resulting loss of traction. To this end, the properties of the mechanical connection between the motor and wheels are taken into account.

For example, in the case of an increasing drive torque, the torsional stiffness of the shaft leads to an increasing angle of twist, from which a motor speed results which is higher than is the case with a constant drive torque. Furthermore, the transmission backlash is passed through in particular at zero crossings of the drive torque. This leads to a motor speed increasing in the short-term, without the wheel speeds having a similar increase in wheel slip. These properties of the mechanical connection between the motor and wheel are mapped by a situation-dependent model which is implemented in the motor controller in order not to be affected by the latency of communication.

The torsion can be compensated, for example, by an increase in the setpoint motor speed. Alternatively or additionally, the transmission backlash can be compensated by a more robust control condition.

The overly-sensitive control of a conventional distributed traction controller triggered by transmission backlash and torsion can be prevented. The advantages of distributed control are maintained so that a higher control quality is achieved.

In the approach presented here, in comparison to a constant motor torque, later control takes place in the case of a dynamically increasing engine torque or zero crossing of the engine torque.

Finally, it should be pointed out that terms like "having," "comprising," etc. do not exclude other elements or steps and terms like "a" or "an" do not exclude a plurality. Reference signs are not to be considered as limiting.

What is claimed is:

1. A method for operating a drive motor coupled to at least one wheel of a vehicle via a drive train, the method comprising:
    actuating the drive motor using a dynamic model of the drive train, wherein the model maps a relationship between a drive torque transmitted via the drive train and a deformation of the drive train, wherein, as the deformation, the model maps a transmission backlash of the drive train as a function of the drive torque, wherein the drive motor is actuated at a zero crossing of the drive torque taking into account the transmission backlash.

2. The method according to claim 1, wherein, as the deformation, the model further maps a torsion of the drive train as a function of the drive torque, wherein the drive motor is actuated taking into account the torsion.

3. The method according to claim 2, wherein a drive speed of the drive motor is controlled using a speed specification and the torsion.

4. The method according to claim 1, wherein a drive speed of the drive motor is controlled at the zero crossing using a speed specification and the transmission backlash.

5. The method according to claim 1, wherein the model further maps at least one control condition for the drive motor as a function of the drive torque, wherein the drive motor is actuated in the event of a change in the drive torque using a control condition of the at least one control condition read out from the model.

6. A method for operating a drive motor coupled to at least one wheel of a vehicle via a drive train, the method comprising:
    actuating the drive motor using a dynamic model of the drive train, wherein the model maps a relationship between a drive torque transmitted via the drive train and a deformation of the drive train, wherein the model further maps at least one control condition for the drive motor as a function of the drive torque, wherein the drive motor is actuated in the event of a change in the drive torque using a control condition of the at least one control condition read out from the model, wherein, as the control condition, a waiting time dependent on the change in the drive torque is read out from the model, wherein the drive motor is actuated with a delay by the waiting time.

7. A motor controller for a drive motor, wherein a dynamic model of a drive train coupled to the drive motor is stored in the motor controller, wherein the motor controller is configured to:
    actuate the drive motor using the dynamic model of the drive train, wherein the model maps a relationship between a drive torque transmitted via the drive train and a deformation of the drive train, wherein, as the deformation, the model maps a transmission backlash of the drive train as a function of the drive torque, wherein the drive motor is actuated at a zero crossing of the drive torque taking into account the transmission backlash.

8. A non-transitory machine-readable storage medium on which is stored a computer program for operating a drive motor coupled to at least one wheel of a vehicle via a drive train, the computer program, when executed by a processor, causing the processor to perform the following:
    actuating the drive motor using a dynamic model of the drive train, wherein the model maps a relationship between a drive torque transmitted via the drive train and a deformation of the drive train, wherein, as the deformation, the model maps a transmission backlash of the drive train as a function of the drive torque, wherein the drive motor is actuated at a zero crossing of the drive torque taking into account the transmission backlash.

\* \* \* \* \*